United States Patent [19]

Ishida et al.

[11] 4,254,923
[45] Mar. 10, 1981

[54] MAGNETIC TAPE CASSETTE

[75] Inventors: Toshihiko Ishida; Yukio Nakazawa, both of Komoro; Haruo Shiba; Kimio Tanaka, both of Saku, all of Japan

[73] Assignee: TDK Electronics Company Limited, Tokyo, Japan

[21] Appl. No.: 60,728

[22] Filed: Jul. 25, 1979

[30] Foreign Application Priority Data

Aug. 2, 1978 [JP] Japan .......................... 53/106524[U]

[51] Int. Cl.³ ............................................ B65H 17/20
[52] U.S. Cl. .................................... 242/199; 226/190
[58] Field of Search .................... 242/197, 199, 55.19; 360/132, 96; 226/186, 190, 193

[56] References Cited

U.S. PATENT DOCUMENTS

| 3,432,083 | 3/1969 | Rentschler et al. ................. 226/186 |
| 3,907,234 | 9/1975 | Sato et al. ...................... 242/55.19 A |
| 4,076,186 | 2/1978 | Oishi et al. ........................... 242/199 |

Primary Examiner—Leonard D. Christian
Attorney, Agent, or Firm—Oblon, Fisher, Spivak, McClelland & Maier

[57] ABSTRACT

A magnetic tape cassette in which a cassette housing has half cases with aligned, confronting projections on innder surfaces thereof on which a cylindrical guide roll with an axial bore therethrough is supported, has an annular, axially projecting rib on either the guide rolls or the projections so as to prevent any burrs which may be on the guide roll around the axial bore therethrough from coming into contact with the projections, thereby preventing noise which might otherwise be caused by the burrs.

4 Claims, 5 Drawing Figures

MAGNETIC TAPE CASSETTE

BACKGROUND OF THE INVENTION

The present invention relates to a magnetic tape cassette, and particularly, it relates to a magnetic tape cassette used in a tape recorder equipped with a microphone.

Recently, a tape recorder equipped with a microphone which has multiple functions and which is called a "cassette teleco" has been used. When such tape recorder is used for a recording, a noise caused by the tape recorder and a noise caused by the magnetic tape cassette are simultaneously recorded. Most of the noise caused by the magnetic tape cassette is the mechanical sound which results in offensive reproduced sound.

SUMMARY OF THE INVENTION

It is an object of the present invention to prevent the noise caused by a magnetic tape cassette, and especially the noise caused by a guide roll.

The foregoing and other objects of the present invention have been attained by providing a magnetic tape cassette which comprises a projection or rib placed between a guide roll which guides a magnetic tape and a receiving step or projection which is formed on a housing to face the guide roll.

DETAILED DESCRIPTION OF THE PREFERRED EMBODIMENTS

Figure 1:
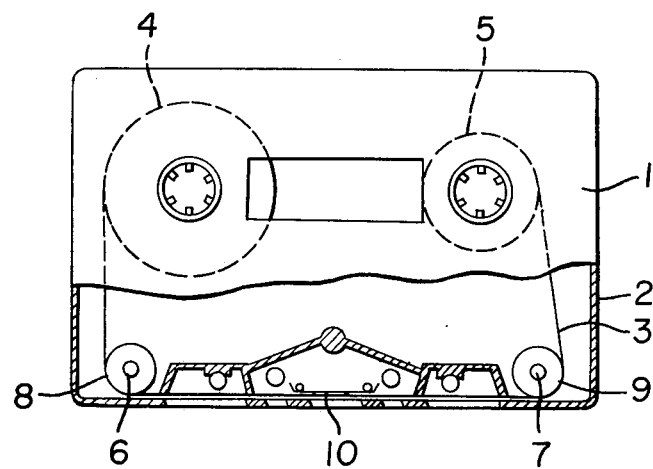
FIG. 1 is a partially sectional view of a magnetic tape cassette.

Referring to the drawings, the conventional magnetic tape cassette and the magnetic tape cassette of the present invention are illustrated.

FIG. 1 shows one embodiment of the magnetic tape cassette. In FIG. 1, the reference numerals (1), (2) designate a housing as half cases; (3) designates a magnetic tape; (4), (5) designate reels for winding the magnetic tape (3); (6), (7) designate rotary shafts placed on an inner surface of the housing (1) or (2); (8), (9) designate guide rolls held on the rotary shafts (6), (7) and (10) designates a pad. The magnetic tape (3) is guided by the guide rolls (8), (9) to run between the reels (4), (5) under the winding operation.

Figure 2:
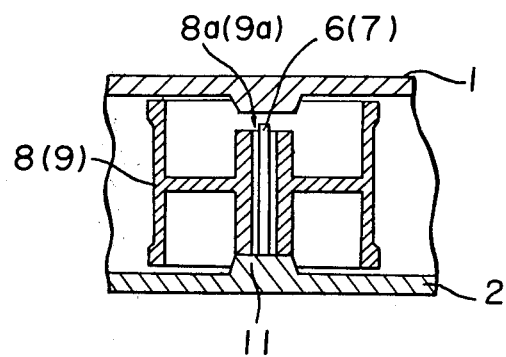
FIG. 2 is a partially enlarged sectional view of the guide roll and its fitting part in a conventional magnetic tape cassette.

FIG. 2 is a partially enlarged sectional view at the fitting part for fitting the guide roll (8) or (9). As shown in FIG. 2 of the conventional magnetic tape cassette, each receiving step or projection (11) for holding the rotary shaft (6) or (7) is formed on the inner surface of the housing (1) or (2) and the upper surface of the step (11) is brought into contact with the lower surface of the guide roll (8) or (9) held by the rotary shaft (6) or (7).

When such magnetic tape cassette shown in FIGS. 1 and 2 is set to a tape recorder equipped with a microphone to perform sound recording and reproducing, a noise similar to a clock sound is caused in each turn of the guide roll (8) or (9). The inventors have found by their experiments that such noise is caused by a burr formed on the guide roll (8) or (9).

Figure 3:
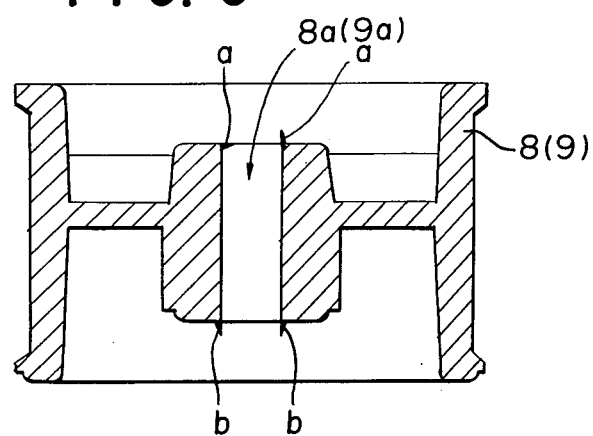
FIG. 3 is a partially enlarged sectional view of the conventional guide roll.

The guide rolls (8), (9) are usually produced by a mass production as plastic molded products which are molded in a mold. It is not easy to eliminate a burr (a), (b) formed at the end of the shaft hollow (8a) or (9a) as shown in FIG. 3. The mass production of the guide rolls has been carried out, allowing the formation of the burr. The guide rolls (8), (9) are small pieces, and accordingly, the burr is quite small. Even though the size of the burr is regulated in the design of the guide roll, it is difficult to control the size of the burr on a guide roll whose size is over the regulation size, as sometimes, occurs in the magnetic tape cassette. Therefore, the burr (a) or (b) is brought into contact with the surface of the receiving step (11) to reproduce the contact sound as a noise similar to the clock sound.

In the molding step, the assembling step or the transferring step, the burr (a) or (b) sometimes come down to the shaft hollow side by contacting the guide rolls. This also causes noises. When the size of the burr is large or the angle of the burr is great, the inner part of the shaft hollow (8a), (9a) is remarkably deformed to cause the disadvantage of the trouble in a smooth rotation of the guide roll (8) or (9) on the rotary shaft (6) or (7).

The object of the present invention is to overcome the trouble caused by the burr by forming a projection or rib between the guide roll and the step.

Figure 4:
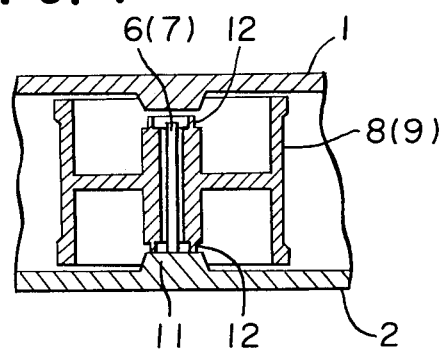
FIG. 4 is a partially enlarged sectional view of the magnetic tape cassette of the present invention.

FIG. 4 is a partially enlarged sectional view of the magnetic tape cassette of the present invention.

In FIG. 4, the reference numerals (1), (2) designate a housing; (6), (7) designate a rotary shaft; (8), (9) designate a guide roll; and (11) designate a receiving step or projection; as identical or corresponding to those of FIGS. 1 and 2.

In this embodiment, an annular projection or rib (12) is formed at the end surface of the guide roll (8) or (9). The guide roll (8) or (9) is brought into contact with the receiving step (11) through the projection (12). The height of the projection (12) in the axial direction is given so as to be higher than the height of the burr formed on the guide roll (8) or (9). According to the experiments, the height of the projection (12) should be at least 0.2 cm. In this embodiment, a projection (12) is formed on both ends of the guide rolls (8) or (9).

Figure 5:
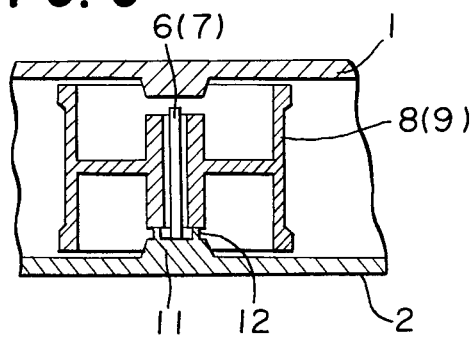
FIG. 5 is a partially enlarged sectional view of another embodiment of the partially enlarged sectional view.

FIG. 5 is a partially enlarged sectional view another embodiment of the magnetic tape cassette of the present invention.

In this embodiment, the projection (12) is mounted on the surface of the receiving step (11).

In the embodiments 4 and 5, the projection is formed in an annular form. Thus, it is possible to form 3 or 4 rod projections around the shaft to form the circular arrangement. It is important to hold the guide roll on the receiving step through the projection. Therefore, the projection should have a form suitable for holding the guide roll on the step. It is preferable to place the contacting surface in equal distance from the center of the axis.

As described above, in the present invention the projection (12) is placed between the guide roll (8) or (9) and the receiving step (11) which is formed on the housing to face the guide roll (8) or (9) whereby the guide roll (8) or (9) is spaced from the burr by the projection

(12) so as to prevent the contact of the burr to the receiving step (11) and the noise caused by contacting the burr with the receiving step (11) can be prevented. Moreover, the burr is protected by the projection (12) whereby the burr does not come down into the shaft hollow (8a) or (9a) and the noise caused by the contact can be prevented and a trouble of the rotation of the guide roll (8) or (9) can be prevented. These advantages can be attained.

What is claimed is:

1. A magnetic tape cassette, comprising:

a housing having half cases with aligned projections on confronting inner surfaces thereof, said projections each having a substantially flat guide roll bearing surface thereon;

a shaft projecting axially from the center of one of the projections toward the other projection;

a tape guide roll rotatably disposed on the shaft and having an axial bore therethrough;

said roll having substantially flat annular end surfaces of about the same diametrical size as the projection end surfaces; and an annular, axially extending rib disposed between the projection end surface and the adjacent roll end surfaces, said rib being spaced radially outwardly from the axial bore through the roll, and defining a support for the roll, whereby any burrs on the roll around the axial bore are prevented from coming into contact with the projection on the housing.

2. The magnetic tape cassette according to claim 1 wherein the rib is mounted on the guide roll.

3. The magnetic tape cassette according to claim 1 wherein the rib is mounted on the receiving roll.

4. The magnetic tape cassette according to claim 1, 2 or 3 wherein a height of the rib is higher than a height of a burr formed on the guide roll.

* * * * *